United States Patent [19]

Stockburger

[11] Patent Number: 4,713,972

[45] Date of Patent: Dec. 22, 1987

[54] POCKET AIR VELOCITY GAUGE

[76] Inventor: Hans-Dieter Stockburger, Richard Wagner Str. 15, 7730 Villingen-Schwenningen, Fed. Rep. of Germany

[21] Appl. No.: 876,225

[22] Filed: Jun. 19, 1986

[30] Foreign Application Priority Data

Jun. 20, 1985 [DE] Fed. Rep. of Germany ....... 3522001

[51] Int. Cl.$^4$ ................................................ G01F 1/28
[52] U.S. Cl. .............................. 73/861.76; 73/861.53
[58] Field of Search ............ 73/861.53, 861.75, 861.76

[56] References Cited

U.S. PATENT DOCUMENTS

| | | | |
|---|---|---|---|
| 2,355,694 | 8/1944 | Ardelt | 73/861.76 |
| 2,690,671 | 10/1954 | Obermaier et al. | 73/861.76 |
| 3,463,003 | 8/1969 | Pierman et al. | 73/861.76 |
| 3,910,114 | 10/1975 | Rasaen | 73/861.76 |

Primary Examiner—Herbert Goldstein
Attorney, Agent, or Firm—McGlew and Tuttle

[57] ABSTRACT

In a pocket air velocity gauge, in order to expand the controlled, flow-dependent pointer deflection and the measuring scale to an angular range of at least 270°, the air flows through an inlet opening (22) on the back of a housing into a ring channel (12) extending around a pointer shaft (6) and over about 360° and leaves it through a lateral outlet opening (13). In so doing, the air moves an air vane (37) fastened to the pointer shaft (6) counter to a restoring spring force in proportion to the velocity of the air. The ring channel (12) is provided with a cross section widening in the flow direction, and the pointer shaft (6) has assigned to it a second restoring spring which becomes active only after a certain angle deflection of the pointer.

18 Claims, 4 Drawing Figures

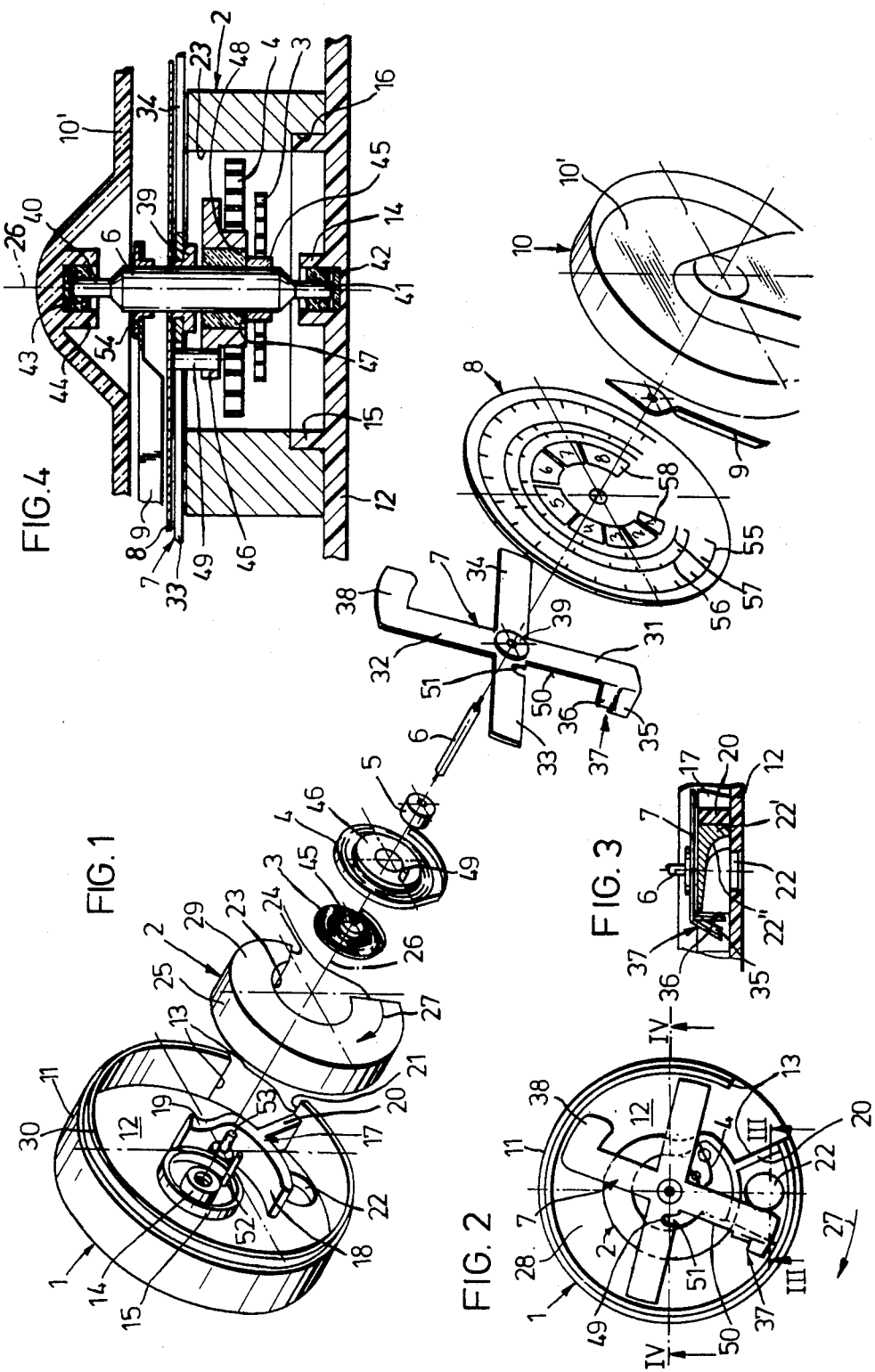

POCKET AIR VELOCITY GAUGE

FIELD AND BACKGROUND OF THE INVENTION

The invention relates to a pocket air velocity gauge wherein the air flows in through an inlet opening on the back of a housing into a ring channel disposed around a central pointer shaft. The channel extends over a center angle of approximately 360° and the air leaves it through an outlet opening disposed at the end of the ring channel in a sidewall of the housing. An air vane disposed on a lever arm fastened to the pointer shaft, is arranged in the ring channel. The vane rotates counter to the action of a restoring spring connected to the pointer shaft, when it is struck by the inflowing air. The vane moves in the flow direction and hence a pointer connected to the vane is deflected a corresponding magnitude over a dial scale associated with the pointer.

In an older German patent application (P 34 11 432.7) a pocket wind velocity gauge of the above kind is described wherein the ring channel, disposed in a round housing, has the same cross section over its entire length and wherein the pointer restoring force is supplied by a single coil spring. The same is the case also in another wind velocity gauge (OS-PS 2 793 528), whose pointer deflection, however, is limited by respective limiting stops to an angle of about 110°, although the ring channel traversed by the air extends over almost 180°.

It is known that the flow pressure which leads to the deflection of the air vane or of the pointer is not directly proportional to the flow velocity of the air in the ring channel, but that this pressure exerted on the air vane is proportional at least approximately to the third power of the flow velocity, assuming constance of the approached surface. Due to this, it is not possible with the known wind velocity gauges to technologically realize a scale and a respective pointer deflection beyond an angle range greater than 110°. Tests have shown that with such velocity gauges, beyond a pointer deflection of about 100°–110°, measuring of air flow is no longer possible because, when this deflection angle is exceeded, the air vane with the pointer is abruptly rotated up to its stop.

SUMMARY OF THE INVENTION

It is the object of the present invention to improve a pocket velocity gauge of the initially mentioned kind in such a way that, with simplest means and in a simplest construction, the controlled flow-dependent pointer deflection and hence the measurement scale can be expanded to an angle range of at least 270°.

According to the invention this problem is solved in that the ring channel has a cross section that widens in the flow direction, and that there is associated with the pointer shaft a second restoring spring which exerts returning forces on the shaft only after a predetermined angle deflection of the pointer, i.e. only after the occurrence of a predetermined flow velocity in the ring channel. Only after this flow velocity has been reached does the second spring exert an additional restoring moment on the pointer shaft.

By this new design of the pocket wind velocity gauge it is not only possible to considerably increase the measurement range angle, i.e. the pointer deflection, as compared with the conventional measuring devices of the kind in question and hence to achieve a higher accuracy of reading, but it is possible also to increase the actual measurement range, i.e. to measure higher wind velocity with greater accuracy than is the case with known measuring devices. By the features of the invention, for example, it has been possible to design a pocket air velocity gauge ready for mass production, the dial scale or scales of which extend over an angle of 280° and comprise a range of from 0 to 20 meters per second or respectively sections 1 to 8 of the Beaufort scale, and it should be pointed out that the scales may have an at least approximately linear graduation.

Another object of the invention is to provide the ring channel with a cylindrical outer contour and an approximately spiral inner contour, both contours having their geometric center approximately at the axis of a pointer shaft. This results in the advantage that over its entire pivot range the air vane can have always the same distance from the outer limiting surface of the ring channel, which distance can be minimized, and that the limiting surface of the ring channel both at the bottom and at the top can be flat.

The use of mutually concentric coil springs and their layout in terms of torque and mutual coordination according to another feature of the invention, has proved, in conjunction with the feature of the ring channel expanding in the flow direction, to be the simplest, most cost-effective means for achieving the objective of the invention and moreover offers a simple possibility of adjustment relative to the neutral position of both restoring springs.

Other developments of the invention involving the use of a jewel bearing, serve to increase the operational safety or stability and also the accuracy of measurement, inasmuch as the friction between the two parts to which the inner ends of the two coil springs are fastened is minimized. According to other features of the invention, the first restoring spring is in the form of a coil spring having its inner end fastened to a hub sleeve that is fixed to the pointer shaft. An inner end of the second spring, which can also be a coil spring, is fastened to a bushing which is rotatably mounted on the pointer shaft. The bushing carries an eccentric pin which extends in the path of movement of a lever arm that is fixed to the pointer shaft. In this way it is possible to provide, as a stop or as an entrainment element for the eccentric pin, a lever arm which is adjustable in the circumferential direction on the pointer shaft, which lever arm is coupled with the pointer shaft for example by means of a friction clutch. The eccentric pin connected to the pointer shaft can protrude into the path of the vane. This is the structurally simplest and also cheapest solution for a connection between eccentric pin and pointer shaft.

According to another object of the invention, the eccentric pin is positioned initially at an angle of about 90° from the point where it engages the lever arm that is fastened to the pointer. The pointer must thus rotate 90° before engaging the eccentric pin and thus before engaging the second restoring spring. This has proven to be advantageous in producing a linear scale and one which accurately reflects the air flow velocity.

The air vane on the lever arm may also be divided into at least two planar sections, one of which being parallel to the axis of the pointer and the other being inclined with respect to the axis of the pointer. The planar sections may also be of equal size with the outer planar section extending parallel to the axis of the pointer. The position of the eccentric pin may also be adjustable.

A still further object of the present invention is to provide a pocket air velocity gauge which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

In the following, an embodiment of the invention will be explained more specifically with reference to the drawings, in which:

FIG. 1 is an exploded representation in perspective of the separate parts of a pocket air velocity gauge according to the invention;

FIG. 2 is a top view onto the assembled pocket velocity gauge of FIG. 1 with the housing cover and cover disk removed;

FIG. 3 is a partial section taken on line III—III from FIG. 2; and

FIG. 4 is a section taken on line IV—IV from FIG. 2 on a larger scale.

DESCRIPTION OF THE PREFERRED EMBODIMENT

The pocket air velocity gauge shown schematically in the drawings consists essentially of a housing bottom 1, a cam body 2, two coil springs 3 and 4, a cylindrical jewel bearing 47, a pointer shaft 6, a cross-shaped air vane body 7, a circular cover disk 8, a pointer 9, and a housing cover 10. The housing bottom 1 is made in one piece of plastic, has a circular form with a cylindrical wall 11 which is integrally formed on a circular bottom 12 and has at one point a ring-sector like radial opening 13 acting as an air outlet opening. Integrally formed at the bottom is a cylindrical centering rib 15 which is concentric with an inwardly projecting bearing hub 14 and which serves to center the cam body in housing bottom 11, for this purpose cam body 2 is provided with a cylindrical cutout 16, the cross section of which coincides with the cross section of the centering rib 15 (see FIG. 4).

Radially outside the centering rib 15 a wall element 17 is formed on the bottom 12. It has a section 18 concentric with the centering rib 15, a cam section 19 projecting radially inwardly substantially in S form, and a radial web 20 which extends perpendicular to the concentric section 18 and connects with the wall 11 in the region of the limiting edge 21 of the cutout 13. Between the concentric section 18 of the wall element 17 and the opposite section of wall 11 there is arranged in the bottom 12, a bore 22 serving as an air inlet opening into the housing. As can be seen from FIG. 3, above bore 22 is a flow direction element 22', the surface 22" of which deflects the air flowing in through bore 22 at right angles.

The cam body 2 has a cylindrical inner contour 23 with the cylindrical cutout 16, but which does not extend over a full circle but has a ring-sector like opening 24 into which the wall element 17 fits. The outer contour 25 of the cam body 2 is not cylindrical, i.e. not circular, but has the form of a cam face whose radius, referred to the bearing axis 26 of the pointer shaft 6 and the cylindrical inner contour 23 concentric therewith, decreases in the direction of the arrows 27 indicating the clockwise direction. Outer contour 25 may be in the form of a spiral surface centered on axis 26. As a result, when the cam body 2 is inserted in the housing bottom 1 in the manner shown in FIG. 2, there forms around the cam body 2 a ring channel 28 which begins at the radial web 20 of wall element 17 and ends at the opening 13 in wall 11 and whose cross section increases clockwise or in the flow direction of the air entering through bore 22 and leaving through the opening 13. The reduction of the cam radius of the outer contour 25 may be constant. i.e. the outer contour 25 has the form of an archimedean spiral according to the formula $r = a \times S$, where the factor a must in any case be less than 1 and the spiral direction is counterclockwise. It is possible also to determine the outer contour 25 of cam body 2 experimentally, i.e. empirically, and the result may be that certain cam sections, in particular the cam section in the lower measurement range, may be in the form of a circle of arc.

The upper limitation of the ring channel 28 is formed by the cover disk 8, which is at as small as possible an axial distance from the end face 29 of the cam body 2 and of the wall element 17, which has the same axial height as the cam body 2. The cover disk 8 is sealingly placed on the end face 30 of wall 11 parallel to the bottom 12. Thus there exists between the end face 29 of cam body 2 and the cover disk 8 an annular gap, which is needed to accommodate the rotating air vane body 7.

The ring vane body 7 consists of a thin flat aluminum sheetmetal part, substantially X-shaped in planeview with four lever arms 31, 32, 33 and 34 in crossed arrangement. Pairs of two lever arms 31 and 32 and respectively 33 and 34 are diametrically opposite each other and extend in the same radial direction. Arranged at the outer end of lever arm 31 is an air vane 37 which is bent in the axial direction and is divided by a substantially axial cut into halves 35 and 36 and has, as counterweight at the outer end of lever arm 32, a tongue 38 extending in the circumferential direction. The two lever arms 33 and 34, extending crosswise to the lever arms 31 and 32, are likewise provided only for equilibrium reasons to avoid tilt moments. In its center the air vane body 7 has a flanged bushing 39 by which it can be non-rotationally fastened on the pointer shaft 6, as can be seen from FIG. 4.

For its suspension the pointer shaft 6 is provided with two bearing pins 40 and 41, which are rotatably mounted with little friction in jewel bearings 42, 43 of the bearings hub 14 of the bottom 12, and respectively of a bearing hub 44 of the housing cover. The arrangement is such that the air vane 37 of vane body 7—arranged non-rotationally on pointer shaft 6 and mounted in the mutually coaxial jewel bearings 42 and 43—protrudes into the ring channel 28. It is possible, due to the division of vane 37 into two approximately equal vane sections 35 and 36, to let e.g. the inner vane section 36 protrude more or less obliquely into the ring channel 28, so that this vane section 35 which extends into the ring channel exactly axially. The division of the air vane 37 into vane sections 35 and 36 thus offers the possibility of adjusting or calibrating the measuring process. To do this the oblique section can be bent more or less obliquely with respect to the axis 26.

The two coil springs 3 and 4, which have different torque characteristics are provided as restoring elements. Coil spring 3, which appears smaller in the drawing and actually is smaller, has a less steep torque characteristic than coil spring 4. The inner end of spring 3 is fastened at a hub sleeve 45, which is pressed onto the end section of pointer shaft 6 toward the bearing hub 14 of bottom 12, and is secured against rotation.

Coil spring 4, which has a larger diameter and greater length as well as greater width and thickness and a steeper torque characteristic than spring 3, is fastened by its inner end to a flanged bushing 46, which, by means of a hollow-cylindrical jewel 47 pressed into its central bore 48, is rotatably mounted on the pointer shaft 6 directly above the hub sleeve 45. As can be seen from FIG. 4, the lower end face of jewel 47 rests loosely on the upper end face of hub sleeve 45. Use of the jewel 47 assures that the least possible bearing friction attainable with simple means exists between bushing 46 and pointer shaft 6.

An eccentric pin 49 is fastened to the flanged bushing 46. This pin 49 protrudes into the plane of the vane body 7 and during its rotation in the direction of the arrows 27 (FIGS. 1 and 2) is engaged and taken along by the leading edge 50 of lever arm 31, after the latter has moved through an initial movement angle of about 90°.

As can be seen from FIGS. 1 and 2, lever arm 33 of vane body 7 has a slot type cutout 51, into which the eccentric pin 49 can plunge freely when the vane body moves back to its neutral position (FIG. 2). In the inactive position of vane body 7 the eccentric pin can assume an angle distance of 90° or more from the entrainment edge 50 of lever arm 31.

The outer end of coil spring 3 is fastened in a manner customary per se to an eccentric pin 52 on housing bottom 1. For the attachment of the outer end of coil spring 4 a second eccentric pin 53 is provided in the region between the wall element 17 and the centering rib 15. It is then possible to arrange these eccentric pins 52 and 53 on centrally mounted adjustable levers (not shown) to be able to adjust the neutral position of the two coil springs 3 and 4 separately.

Another possibility is to let the eccentric pin 49 strike, not against the limiting edge 50 of lever arm 31, but against a separate lever which is adjustable relative to the vane body 7 but likewise mounted on the pointer shaft 6, thereby making the adjustability of the point at which the second coil spring 4 becomes active, variable.

On the outside of the cover disk 8, several concentric dial scales 55, 56, 57, and 58 are printed, over which moves the pointer 9, which by means of a bearing bushing 54 is arranged non-rotationally on the pointer shaft 6 directly above the cover disk 8, and which is as visible as the dial scales through the transparent ring surface 10' of the housing cover 10. While the outer dial scale 55 indicates meter per second (m/s), the two inner dial scales 56 and 57 may be calibrated in km/hour or miles/hour, and the inner scale 58 consisting of ring sectors of unequal size may indicate the wind force according to the Beaufort scale.

In using the above described pocket velocity gauge, the housing bottom 12 is held with its bore 22 against the wind or respectively in the travel direction, so that the inflowing air can enter through bore 22 into the ring channel 28 and can leave it through the radial outlet opening 13. Depending on the flow velocity, the vane body 7 is rotated in the direction of the arrows 27 and the amount of rotation is indicated, the maximum pointer deflection is about 280°. This great pointer deflection is made possible in particular by the use of two restoring springs 3 and 4, expansion or contraction is readily possible, i.e. placing within the maximum pointer stop a greater or smaller measurement range, so that for example the entire Beaufort scale is included and not only the range 1 to 8, as in the shown embodiment.

Another possibility is to divide the air vane into several, e.g. three segments, to obtain a finer adjustment, in which two or three segments are set with different obliquity, thus resulting in different approach surfaces.

While a specific embodiment of the invention has been shown and described in detail to illustrate the application of the principles of the invention, it will be understood that the invention may be embodied otherwise without departing from such principles.

What is claimed is:

1. A pocket air velocity gauge comprising, a housing defining a space, a central pointer shaft mounted for rotation to said housing about an axis, means defining a ring channel in said space around said axis, said housing having an inlet into one end of said channel and an outlet into an opposite end of said channel for the flow of air into said inlet, in a flow direction along said channel and out of said outlet, said channel increasing in cross-sectional area from said inlet to said outlet, a lever arm connected to said pointer shaft, an air vane connected to said lever arm and disposed in said ring channel, air entering said inlet opening striking said vane to rotate said lever arm around said axis, a first restoring spring operatively connected to said lever arm for exerting a restoring force on said lever arm for biasing said vane toward said inlet, said first restoring spring being active to bias said vane through the entire rotation of said lever arm, a second restoring spring, engagement means operatively connected between said second restoring spring and said lever arm for connecting said second restoring spring to said lever arm only after said lever arm has rotated a selected angle to bias said vane back toward said inlet only after said lever arm has rotated said selected angle, a pointer connected to said pointer shaft and a dial scale connected to said housing over which said pointer moves to indicate a rotation of said pointer shaft.

2. A gauge according to claim 1 wherein said ring channel extends about 360° around said axis, said inlet extending axially through said housing into said ring channel and said outlet extending radially through said housing and out of said ring channel.

3. A gauge according to claim 2 wherein said means defining said ring channel comprises an outer cylindrical wall defining an outer cylindrical contour for said ring channel and an inner spiral wall defining an inner spiral contour of said ring channel, said inner and outer walls being at least approximately centered on said axis.

4. A gauge according to claim 3 wherein said first and second restoring springs both comprise coil springs disposed concentrically with said axis, said second restoring spring having a steeper torque characteristic than said first restoring spring, said first restoring spring being fixed between said pointer shaft and said housing for continuously biasing said lever arm and said second restoring spring being connected between said housing and said engagement means for engaging said lever arm only after rotation of said lever arm about said selected angle.

5. A gauge according to claim 2 wherein said first and second restoring springs both comprise coil springs disposed concentrically with said axis, said second restoring spring having a steeper torque characteristic than said first restoring spring, said first restoring spring being fixed between said pointer shaft and said housing for continuously biasing said lever arm and said second restoring spring being connected between said housing and said engagement means for engaging said lever arm only after rotation of said lever arm about said selected angle.

6. A gauge according to claim 2 wherein said first restoring spring comprises a coil spring having an outer end connected to said housing and an inner end, a hub sleeve connected to said inner end of said first restoring spring, said hub sleeve being fixed to said pointer shaft , said second restoring spring comprising a coil spring having an outer end connected to said housing and an inner end, a bushing connected to said inner end of said second restoring spring, said bushing being rotatably mounted on said pointer shaft, said engagement means comprising an eccentric pin extending parallel to said axis and being connected to said bushing in a path of movement of said lever arm. said lever arm being engagable against said eccentric pin after rotation of said lever arm through said selected angle, said lever arm being biased by restoring forces of said second restoring spring when said lever arm rotates beyond the selected angle.

7. A gauge according to claim 6 wherein said bushing comprises a jewel having a central opening through which said pointer pin extends.

8. A gauge according to claim 7 wherein said jewel is slideably engaged against said hub sleeve which is connected to said first restoring spring.

9. A gauge according to claim 6 wherein said selected angle is 90°, said lever arm having an engagement edge which is engagable against said eccentric pin with rotation of said lever arm by said selected angle.

10. A gauge according to claim 6 wherein said lever arm comprises a cross-shaped air vane body having a plurality of arm portions, one of said arm portions carrying said vane, another of said arm portions having a recess for receiving said eccentric pin before said lever arm has rotated by said selected angle.

11. A gauge according to claim 2 wherein said engagement means comprises a bushing fixed to said second restoring spring and an eccentric pin connected to said bushing and engagable by said lever arm with rotation of said lever arm beyond said selected angle.

12. A gauge according to claim 2 wherein said housing comprises a housing bottom, a cover dial over said housing bottom closing said space and a housing cover over said cover dial covering said cover dial, said cover dial carrying said dial scale, said pointer being fixed to said pointer shaft and being movable over said cover dial, said lever arm being fixed to said pointer shaft and being rotatable under said cover dial and in said space, said means defining said ring channel comprising an inner cam body having an outer spiral contour defining an inner wall of said ring channel and said housing bottom having an outer cylindrical wall having an inner cylindrical contour defining an outer wall of said ring channel.

13. A gauge according to claim 12 wherein said lever arm has a cross shape with four arm portions, one of said arm portions carrying said vane and having an engagement edge, said engagement means comprising a bushing fixed to said second restoring spring and rotatably mounted on said pointer shaft with an eccentric pin extending from said bushing and engagable with said engagement edge after said lever arm rotates by said selected angle, said selected angle being about 90°.

14. A gauge according to claim 13 wherein said bushing comprises a jewel rotatably mounted on said pointer shaft, said first restoring spring having a hub sleeve fixed to said pointer shaft on which said jewel rotates.

15. A gauge according to claim 14 wherein said first and second restoring springs each comprised coil springs having outer ends connected to said housing and inner ends connected respectively to said hub sleeve and jewel bushing.

16. A gauge according to claim 15 wherein said vane includes at least two planar sections, one of said sections extending parallel to said axis and the other of said sections extending obliquely with respect to said axis.

17. A gauge according to claim 1 wherein said vane includes at least two planar sections, one of said planar sections extending substantially parallel to said axis and the other of said planar section extending obliquely with respect to said axis.

18. A gauge according to claim 17 wherein said planar sections are of about equal size, a radial outer one of said planar sections being parallel to said axis.

* * * * *